United States Patent
Rolls et al.

(10) Patent No.: US 8,381,309 B2
(45) Date of Patent: Feb. 19, 2013

(54) METHODS AND SYSTEMS FOR SECURE COMMUNICATION OVER A PUBLIC NETWORK

(75) Inventors: Dan Rolls, Rehovot (IL); Iphtach Cohen, Atlit (IL)

(73) Assignee: Famillion Ltd., Road Town, Tortola (VG)

( * ) Notice: Subject to any disclaimer, the term of this patent is extended or adjusted under 35 U.S.C. 154(b) by 647 days.

(21) Appl. No.: 12/518,212

(22) PCT Filed: Dec. 9, 2007

(86) PCT No.: PCT/IL2007/001518
§ 371 (c)(1),
(2), (4) Date: Jun. 15, 2009

(87) PCT Pub. No.: WO2008/068766
PCT Pub. Date: Jun. 12, 2008

(65) Prior Publication Data
US 2010/0011436 A1    Jan. 14, 2010

Related U.S. Application Data

(60) Provisional application No. 60/873,252, filed on Dec. 7, 2006, provisional application No. 60/873,254, filed on Dec. 7, 2006.

(51) Int. Cl.
*H04L 29/06* (2006.01)
(52) U.S. Cl. ............ 726/28; 705/325; 713/186
(58) Field of Classification Search .......... None
See application file for complete search history.

(56) References Cited

U.S. PATENT DOCUMENTS

| | | | |
|---|---|---|---|
| 7,051,204 | B2 | 5/2006 | Pitsos |
| 2001/0052013 | A1 | 12/2001 | Munguia et al. |
| 2004/0010697 | A1 | 1/2004 | White |
| 2004/0148275 | A1 | 7/2004 | Achlioptas |
| 2004/0189441 | A1* | 9/2004 | Stergiou ............ 340/5.51 |
| 2005/0120214 | A1 | 6/2005 | Yeates et al. |
| 2005/0171832 | A1 | 8/2005 | Hull et al. |
| 2005/0198291 | A1 | 9/2005 | Hull et al. |
| 2006/0042483 | A1 | 3/2006 | Work et al. |
| 2006/0072569 | A1 | 4/2006 | Eppinger et al. |

FOREIGN PATENT DOCUMENTS

| | | |
|---|---|---|
| EP | 1672871 A2 | 6/2006 |
| WO | 2005072315 A2 | 8/2005 |
| WO | 2006073542 A2 | 7/2006 |
| WO | 2007083313 A2 | 7/2007 |

OTHER PUBLICATIONS

Yu et al., A Social Mechanism of Reputation Management in Electronic Communities, Proceedings of Fourth International Workshop on Cooperative Information Agents, 2000, pp. 154-165.
International Search Report dated Apr. 22, 2008 in corresponding International Application No. PCT/IL2007/001518.

* cited by examiner

*Primary Examiner* — Gilberto Barron, Jr.
*Assistant Examiner* — Izunna Okeke
(74) *Attorney, Agent, or Firm* — Vorys, Sater, Seymour and Pease LLP; Susanne M. Hopkins; William L. Klima

(57) ABSTRACT

A method and system are presented for providing communication between users over a communication network. A database is provided which comprises verified data relating to identity of a plurality of individuals. The database is accessible through the network. The verified data allows for authenticating the identity of the individuals. One or more levels of permitted communications between individuals in said database and the user are defined on the basis of said verification.

17 Claims, 9 Drawing Sheets

| EXPOSURE LEVEL | EXPOSURE |
| --- | --- |
| 1 | ALLOW ONE'S GENERAL PROFILE TO BE EXPOSED ANONYMOUSLY TO ANOTHER (AGE, SENDER, LOCATION, OCCUPATION, HOBBY) |
| 2 | ALLOW ONE'S PERSONAL PROFILE TO BE EXPOSED ANONYMOUSLY (PHYSICAL BIOLOGICAL TRAITS, ETHNIC ORIGIN, RELIGION, SEXUAL PREFERENCE, MARITAL STATUS |
| 3 | ALLOW ONE'S FINANCIAL/BUSINESS PROFILE TO BE EXPOSED ANONYMOUSLY (EMPLOYMENT, BUSINESS FUNCTION, SOCIAL/ECONOMIC STATUS |
| 4 | ALLOW ONES' GENERAL PROFILE TO BE EXPOSED TO FAMILY MEMBERS ($1^{ST}$-$3^{RD}$ DEGREE) |
| 5 | ALLOW ONE'S PERSONAL PROFILE TO BE EXPOSED TO FAMILY MEMBERS |
| 6 | ALLOW ONE'S FINANCIAL PROFILE TO BE EXPOSED TO FAMILY MEMBERS |
| 7 | ALLOW ONE'S GENERAL PROFILE TO BE EXPOSED TO THE PUBLIC |
| 8 | ALLOW ONE'S PERSONAL PROFILE TO BE EXPOSED TO THE PUBLIC |
| 9 | ALLOW ONE'S BUSINESS PROFILE TO BE EXPOSED TO THE PUBLIC |
| 10 | ALLOW ONESELF TO BE EXPOSED ONLINE TO A FAMILY MEMBER |
| 11 | ALLOW ONESELF TO BE EXPOSED ONLINE TO A BUSINESS COLLEAGUE |
| 12 | ALLOW ONESELF TO BE EXPOSED ONLINE TO THE PUBLIC |

FIG. 4B

METHODS AND SYSTEMS FOR SECURE COMMUNICATION OVER A PUBLIC NETWORK

CROSS REFERENCE TO RELATED APPLICATIONS

This application is a National Stage of International Application PCT/IL2007/001518, filed 9 Dec. 2007, which claims priority of Provisional Patent Application No. 60/873,252, filed 7 Dec. 2006 and Provisional Patent Application No. 60/873,254, filed 7 Dec. 2006, all three of which are incorporated herein by reference in their entireties.

FIELD OF THE INVENTION

This invention relates to methods and systems for communication over public networks and more particularly to secure methods for communication over public networks.

BACKGROUND OF THE INVENTION

In modern Internet communication, an individual or business is sometimes exposed to non-secure connections and to communications from unreliable or falsely-identified senders.

Some publications in the field include:

US Patent Publication No. 2001/052013 to Ahlberg et al., which describes secure server architecture for web based data management.

US Patent Publication No. 2004/010697, to White, describes a biometric authentication system and method.

US Patent Publication No. 2005/120214, to Bazlen et al., describes systems and methods for enhancing security of communication over a public network.

US Patent Publication No. 2005/198291, to Brown et al., describes a remote access system and method.

US Patent Publication No. 2006/072569 to Eppinger et al., describes a network address translation protocol for transmission control protocol connections; and U.S. Pat. No. 7,051,204, to Pitsos, describes methods and systems for providing secure data distribution via public networks.

GENERAL DESCRIPTION

There is still a need in the art for communication channels over public networks with a high level of security.

The present invention describes a method and system for secure communication over a public network, in particular, for user-defined self-exposure in communications over a public network. The present invention is directed to a method for user-defined communication between authenticated users over at least one public communication network. According to this method, a database is provided including data relating to a plurality of users and stored in a memory utility of a computerized system, which is in communication with the at least one public communication network. At least some of the data in said database is verified so as to authenticate an identity user(s), and the authenticated users are allowed to at least partially define a communication level over the public communication network.

In accordance with the invention a solution for secure communication over a public network is provided. The present invention aims at improving confidence in the identity of a party to an electronic communication. Electronic communication may be an exchange of messages via email or instant massaging ("chat"), voice communication, accessing data or document(s) stored in a computer and accessible through a network, etc.

In general, the present invention provides means for verifying identity of a user that is or may be a party of an electronic communication. Through such verification users may be identified and classified into different classes, for example: a class of users the identity of whom is verified with a defined degree of reliability and are thus permitted to communicate with other users or a subset of other users; a class of users the identity of whom is verified with a lower degree of reliability and are thus permitted only a low level of communication with other users or a subset of other users. A non-limiting example is an electronic filter permitting email communication or other type of electronic messaging only of verified users and rejecting others or permitting only a limited degree (or "flagged") communication with non-verified users.

Each message or document has an originator and it may be tagged or associated (automatic or on demand) with a reliability score based on the originator's-related data in said database. Also, depending on the originator, the document or message may be tagged or associated with a user-defined level of exposure defining the class of other user data of whom is included in said database, that are permitted to view the entire document or message or part thereof.

The database of verified data of plurality of individuals may be created by permitting the plurality of users to enter user-associated data, which data is used to generate a user-identifier data set (IDS), one for each user, being either one of the users or one of the user's related individuals. All the IDSs are further processed to construct the database. The construction of the database may be an ongoing process. Each added data on one of the individuals works in fact to improve reliability of other individuals related to such an individual through family or another type of relationship.

Often, the verification of at least some of the data in the database comprises verifying the IDS of each user. In some cases, verifying the IDS further comprises determining a level of confidence based on the degree of identity between data on the user entered by different users.

According to some embodiments, the level of confidence is determined as a percent data identity. In some cases, a high level of confidence is a level above 90%. In some further cases, a high level of confidence level is at least 95%.

Some embodiments of the present invention are directed to a method wherein the user is authenticated at a confidence level of at least 95%.

According to some embodiments, the verification of at least some of the data in the database substantially eliminates a false identity. The false identity may be, in some cases, selected from an intentionally false identity, a non-intentional false identity; a joke; and a borrowed identity.

Some embodiments of the present invention are directed to a method as described herein, wherein the user-associated data comprises individual-associated data bits (IDBs), wherein each of the IDBs comprises personal identifiers and relationship data comprising data on one or more related users and the nature of relationship.

According to some embodiments, the authenticated identity includes at least one identity characteristic. The characteristic may be selected from the height, gender, blood type, eye color, consumer preferences, hobbies, areas of interest, location of domicile, ethnic origin, religion and mother tongue of the authenticated user.

Some embodiments of the present invention are directed to a method as described herein in which at least some of the authenticated users communicate over the communication network(s). In some embodiments, by contrast, at least some of the authenticated users do not communicate over the at least one communication network.

The present invention is further directed to methods as described herein wherein allowing the at least two of the authenticated users each to at least partially define a communication level comprises providing at least one of the authenticated users with a graded personalized exposure mechanism. In some cases, the graded personalized exposure mechanism is configured to enable an authenticated user to expose his identity at different levels responsive to the type of communication. The type of communication is selected from personal, commercial, general and online self-exposure. The mechanism, according to some examples, provides a personalized protection level responsive to the type of communication.

Some embodiments of the present invention relate to methods as described herein wherein the graded personalized exposure mechanism enables an authenticated user to expose his identity at different levels responsive to the at least one of a sender and a recipient of the communication.

According to some embodiments, allowing the at least two of the authenticated users each to at least partially define a communication level comprises providing at least one of the authenticated users with a graded personalized receiving mechanism. The graded personalized receiving mechanism may be configured to enable an authenticated user to receive communications at different levels responsive to the type of communication. In some non-limiting examples, the type of communication is selected from personal, commercial and general. Typically, the mechanism provides a personalized protection level responsive to the type of communication.

In some cases, the graded personalized receiving mechanism enables an authenticated user to expose his identity at different levels responsive to the at least one of a sender and a recipient of the communication.

According to some embodiments, in the method described herein, the verification of data further comprises providing a user with a score for the reliability of the data. The data may be that provided by said user, or by another user. In some cases, the user is an authenticated user. The score may be provided in real time on-line. This may comprise further processing of all the IDSs to construct a database comprising IDSs of identified users and their position in a relationship web, and providing a user with a score for the reliability of the data relating to the relationship web, where the data may be supplied by the user, another user, an authenticated user or from another source.

The present invention thus provides a method for communication between users over a communication network, comprising: providing a database which comprises verified data relating to identity of a plurality of individuals. The database is accessible through the network. The verified data permits the authentication of the identity of the individuals. One or more levels of permitted communications between individuals in said database and the user are defined on the basis of said verification. The user may or may not be an individual data of whom is included in the database.

In accordance with one embodiment, the database is created in a manner as described in WO 07/083,313, assigned to the assignee of the present application, and is briefly as follows. Each of a plurality of individuals is permitted to enter an individual-associated data bits (IDB) comprising a personal identifier and relationship data with one or more other individuals. An individual-associated data set (IDS) is generated for each individual comprising data on the individual and on related individuals. The IDSs are then compiled to construct said database. The IDB is typically comprised of data enabling the construction and thus indicative of a family tree.

Typically, according to the method of the invention, a level of reliability (confidence) in the authenticity is determined based on correspondence between data on the individual entered by different users. The authenticated individual may be provided with a graded personalized exposure mechanism configured to enable a user who is the authenticated individual to expose his identity at different levels responsive to the type of communication. The graded personalized exposure mechanism may provide a personalized protection level responsive to the type of communication. The graded personalized exposure mechanism may also be configured to enable the authenticated user to expose his identity at different levels responsive to senders or recipients of the communication.

Authenticating of the identity of the individuals may comprise providing a user with a score for the reliability of the data.

The invention also provides a system for enabling communication between users over a communication network. The system comprises a server system associated with a database comprising data relating to a plurality of individuals. The server system is configured and operable to verify at least some of the data so as to authenticate an identity of the individual, thus allowing to define one or more levels of permitted communication between individuals in said database and the user on the basis of said verification.

The invention also provides a method for communication over a communication network. The method comprises: providing an organizational chart of data relating to a plurality of individuals; verifying at least some of the data so as to authenticate an identity of at least one of the individuals; and allowing at least one individual to define one or more levels of permitted communication between the individual and a network user on the basis of said verification.

BRIEF DESCRIPTION OF THE DRAWINGS

In order to understand the invention and to see how it may be carried out in practice, preferred embodiments will now be described, by way of non-limiting example only, with reference to the accompanying drawings, in which:

FIG. 4B is a simplified illustration of an exposure level scoring system for use in the method of FIG. 4A.

DETAILED DESCRIPTION OF EXEMPLARY EMBODIMENTS

Figure 1:
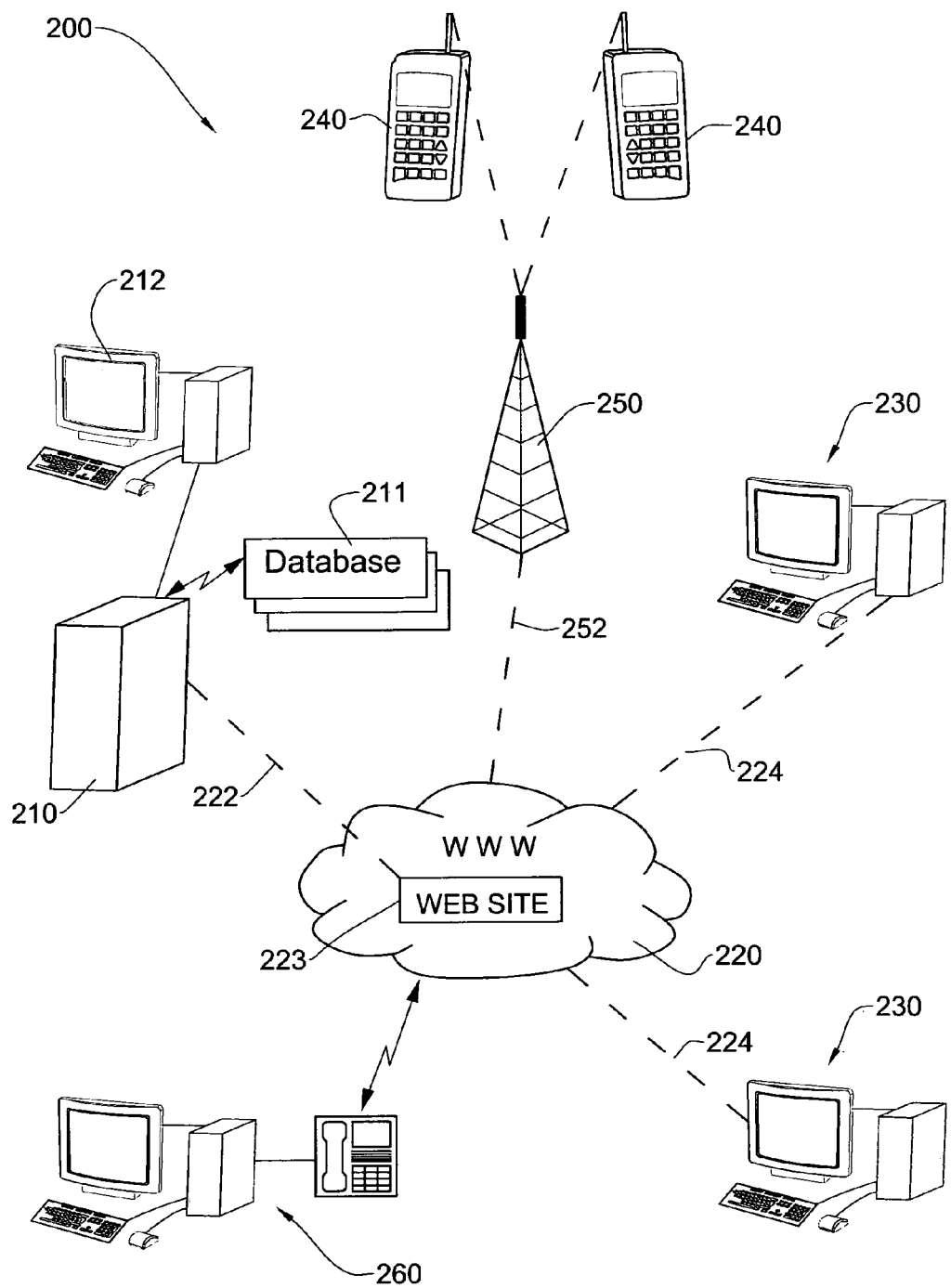
FIG. 1 is a schematic illustration of a system according to an embodiment of the invention.

The present invention describes methods and a system for user-defined self-exposure in communication over a public network.

The term "individual-associated data bits" or "IDBs" denotes pieces of data that relate to the individual entering the data. Each of the IDBs is unique for a specific individual and distinguishes one individual from another. The IDBs include a series of data pieces, typically sufficient at least to unequivocally identify a specific individual. The IDBs include both personal identifiers and relationship data, defined below.

The term "personal identers" denotes pieces of data on the data-entering individual. Personal identifiers may include formal identifiers such as name, address, birth date, etc., and other identifiers such as education, profession, interests, hobbies, health data, blood type, tissue type, genetic profile, martial status, etc. The data bits to be entered by an individual may typically include essential data bits without which the data will not processed, and may also include some optional data. Where a user interface is provided this may be in the form of essential fields and optional fields.

The entered data may typically include a minimum set of data that can jointly identify an individual with high degree of probability. Said minimum set of data typically includes a combination of identifiers that distinguish the specific individual from any others and thus unequivocally define the individual with a high degree of probability; namely the chance of mistaking such an individual for another is very low. Said minimum set of data should preferably be entered both with respect to the personal identifiers as well as with respect to the identifiers of the related individuals. Such minimum set of data typically includes familial data, namely at least some data relating to the individual's family.

The term "relationship data" denotes pieces of data that relate to individuals that the data-entering individual has some form of relationship with. Particular example includes other individuals with whom the data-entering individual has some form of family ties. These may include first degree family members (parents, brothers and sisters, spouse, children) as well as further (second, third, etc.) degree family members (grandparents, cousins, in-laws, etc.). The family members included in the relationship data may be living and/or dead. In addition, the relationship data may also include data on other type of related individuals including friends, acquaintances, neighbors, business colleagues or associates, members of societies or organizations to which the individual belongs, and others. The relationship data, in addition to including some formal identifiers of the related individuals, includes data relating to the type of relationship, whether it is past and/or present relationship, etc.

By "IDS" is meant a set of data pertaining to an identified individual, namely and individual data set (IDS).

The IDBs entered by an individual are processed to generate an individual-identifier data set (IDS) for each identified individual.

The term "identified individual" relates to each individual, data on individuals who were included in entered IDBs. This includes the data-entering individual and any related individual. The IDS may include data based on that entered by the entering individual, optionally differently arranged; or may be refined data, namely data that was initially processed, for example: to correct inherent inconsistencies; eliminate data which is inherently inconsistent and the inconsistency cannot be resolved; data corrected on the basis of IDBs entered by other individuals (see below); ascribing a reliability score to each of the IDBs (see below); etc. Other individuals entering data may include in their IDBs data on a first individual which the latter either forgot to enter or is not aware of, for example information on distant relatives, on family origin, on mother's maiden name; such other individuals may mention the first individual as a related individual (e.g. as a friend, a business colleague, as co-member of a society organization, etc.). The IDS for an identified individual may be continuously updated upon relevant data entry by other individuals.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", "deriving", "generating" or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of memory including floppy disks, optical disks, CD-ROMs, Disk-on-Key, smart cards (e.g. SIM, chip cards, etc.), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions capable of being conveyed via a computer system bus.

The processes/devices presented herein are not inherently related to any particular electronic component or other apparatus, unless specifically stated otherwise. Various general purpose components may be used in accordance with the teachings herein, or it may prove convenient to construct a more specialized apparatus to perform the desired method. Examples of the desired structure for a variety of these systems will appear from the description below. In addition, embodiments of the present invention are not described with reference to any particular programming language. It will be appreciated that a variety of programming languages may be used to implement the teachings of the inventions as described herein.

The references cited in the background teach many principles of computerized management of related data records that are applicable to the present invention. Therefore the full contents of these publications are incorporated by reference herein where appropriate for teachings of additional or alternative details, features and/or technical background.

The term "criterion" used in this patent specification should be expansively construed to include any compound criterion, including, for example, several criteria and/or their combination.

The term "data record" or "record" used in this patent specification should be expansively construed to include a group of information elements treated as a single logical entity. The record may comprise one or more sub-records, each sub-record comprising one or more fields or other logical sub-entities.

The term "discrepancy" used in this patent specification should be expansively construed to include any compound discrepancy, including, for example, several discrepancies and/or their combination.

The term "family tree" used in this patent specification should be expansively construed to include any model for organizing one or more data repositories in a hierarchical arrangement comprising parent and children nodes. It should be understood that a tree may be of different complexity, e.g. be as simple as one parent and one child, as complex as the theoretical "single family tree" that links all data in the repositories, etc.; two or more trees may overlap, or one tree may completely include one or more other trees.

The term "object identifier" used in this patent specification should be expansively construed to include a set of data enabling distinguishing a certain object from any others with a probability matching certain criterion.

The term "related data records" used in this patent specification should be expansively construed to include a group of data records wherein records in said group are related by common values comprised in and/or associated with one or more sub-records, said common values matching certain criterion.

The term "related family trees" used in this patent specification should be expansively construed to include two or more trees having at least one common node.

In some embodiments, two or more family trees are considered as related trees if there exists a list of related parameters pertaining to a certain individual in a defined sequence in a standardized order, for example, as follows: Christian name, surname, maiden name, parents' names including mother's maiden name, four grandparents' names (first maternal and then paternal) including grandmothers' maiden names, siblings' names; children's names and spouse's name, including maiden name. For example, Dan; Rolls; Yossi; Tamar; Aria; Reva Agronski; Klafaoch; Eran; Orly; Daiha; +Ori Aria; Anna Reva; Asya Koperman.

The so-defined sequence is one form of presenting the IDB data which can be used to merge and match information pertaining to different individuals and to form a connection between different individuals in the formation of a relationship web. This sequence is part of the IDB and comprises data, typically with regard to first degree family and details thereof. This concept is a subject of co-pending patent application having publication No. US 2009/248653, which is incorporated herein by reference.

Reference is made to FIG. 1, which is a schematic illustration of an example of a communication system, generally designated 200, configured and operable for providing secure communication over a public network, e.g. the Internet.

System 200 includes a server system 210, which may include one or a plurality of servers and one or more control computer terminals 212 for programming, trouble-shooting servicing and other functions. Server utility 210 is linked to the Internet 220 (constituting a computer network) through link 222, for running system website 223 and for communication with the users. Typically, website 205 may support international communications from around the world in and may be constructed to provide services in a number of languages. Users may communicate with the server through a plurality of user computers 230, which may be mainframe computers with terminals that permit individual to access a network, personal computers, portable computers, small hand-held computers and other, that are linked to the Internet 220 through a plurality of links 224. The Internet link of each of computers 230 may be direct through a landline or a wireless line, or may be indirect, for example through an intranet that is linked through an appropriate server to the Internet. The system may also operate through communication protocols between computers over the Internet which technique is known to a person versed in the art and will not be elaborated herein. Users may also communicate with the system through portable communication devices such as $3^{rd}$ generation mobile phones 240, communicating with the Internet through a corresponding communication system (e.g. cellular system) 250 connectable to the Internet through link 252. As will readily be appreciated, this is a very simplified description, although the details should be clear to the artisan. Also, it should be noted that the invention is not limited to the user-associated communication devices—computers and portable and mobile communication devices—and a variety of others such as an interactive television system may also be used. The system 200 also typically includes at least one call and/or user support center 260. The service center typically provides both on-line and off-line services to users from the at least one professional. In some embodiments, there is a plurality of service centers associated with server system 210.

The server system 210 is associated with a memory utility 211, which may be a constructional part of the server system (one or more of its computer systems) or may be a distributed database which may be at least partly located at the server system 210. The system 210 is configured according to the invention for using the database 210, comprising verified data related to a plurality of individuals, to provide secure communication between the network user with one or more of said individuals. It should also understood that the server system 210 may include software agents or the so-called "min-server utilities" installed in the users' personal communication device.

It should be noted that a copy of the user-related data record (being a data piece of the database 211) may be stored in a memory utility of the user's personal communication device (e.g. his personal computer), or alternatively, such user's data record being a data piece of the database 211) is stored only in the user's personal communication device and is accesses from the server when needed, e.g. after obtaining the user's permission.

Additionally, the server 210 may also be the server that creates the verified database 211 based on data received from the users, being initiated in either pull or push mode. The database 211 includes the IDSs of all identified individuals and the relationship web. The server system 210 may be equipped with various utilities for controlling, updating, extracting or changing data in the database 211. The principles of construction of such verified database are described in WO 07/083,313, assigned to the assignee of the present application, WO 07/083,313 being therefore incorporated herein by reference.

Figure 2:
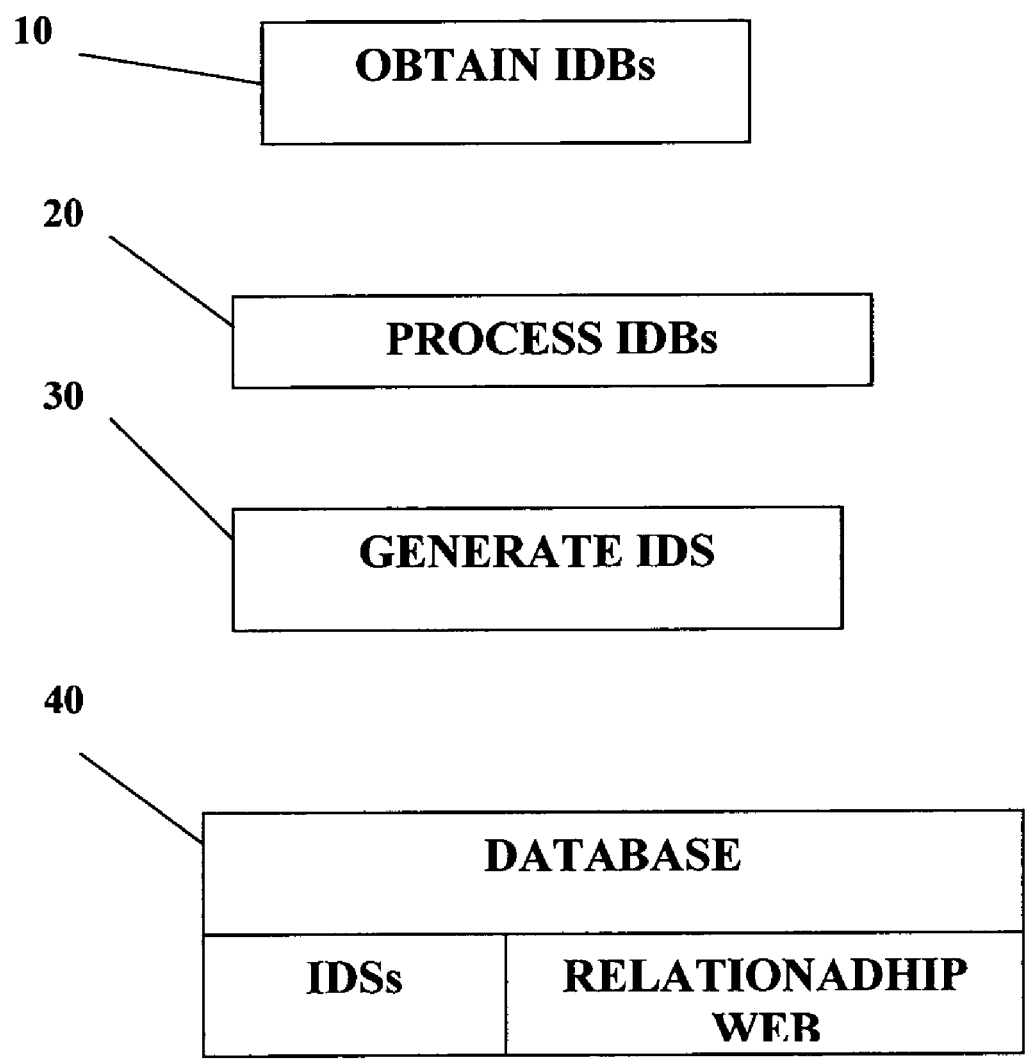
FIG. 2 is a block diagram of a method of creation of the verified database according to an embodiment of the invention.

FIG. 2 shows the main steps in creating the verified database 211. As shown, individuals are permitted to enter individual-associated data bits (IDBs) into a computerized system (step 10). The obtained IDBs include each a personal identifier, which includes data relating to the individual and relationship data. The relationship data includes data on the individual himself and data on one or more related individuals, typically individuals related to the data-entering individual by family. The relationship data also includes data on the nature of relationship with the related individuals (e.g. child, parent, sibling, etc.). The IDBs are processed (step 20) to generate IDSs (step 30), one for each identified individual. A verified database of IDSs is then constructed (step 40) which includes the IDSs of all identified individuals and a relationship web, the latter including data on the relationship links between identified individuals. The relationship web may be one merged relationship web from all individuals or may include a plurality of such webs for different groups of identified individuals.

Figure 3A:
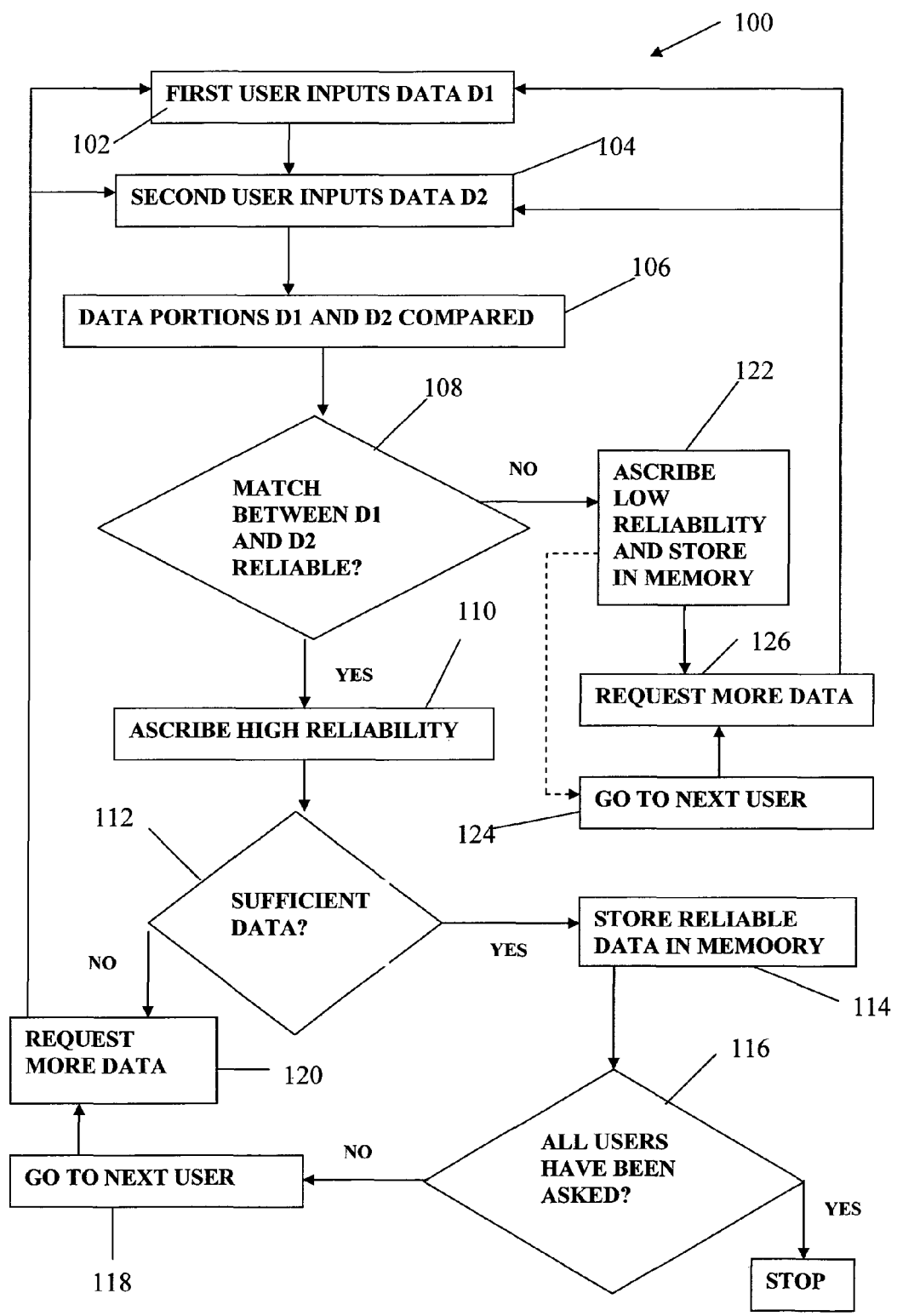
FIG. 3A is simplified flowchart of a method for verifying the identity of an individual, according to an embodiment of the present invention.

Referring to FIG. 3A there is illustrating a simplified flowchart 100 of a method for verifying the identity of an individual, according to an embodiment of the present invention.

First and second users input their individual data bits $D_1$ and $D_2$, respectively (steps 102 and 104) into the system 200 via a communication device (e.g. phone, computer, etc.) connectable to the system 200 via the Internet. As described hereinabove the data bits, such as IDBs, may include both personal identifiers and relationship data.

This inputting step may occur over a number of hours or over an extended period of time. The step may be continuous or intermittent. In some cases, the user inputs his data bits responsive to individual questions. The user may input his data by double-clicking on a broad IDB. In this case, the double-click function is operative to open a window in which there are individual questions particularly pertaining to himself and/or to his close relatives; or to open a window in which there are forms such as purpose-made questionnaires pertaining to himself and/or to his close relatives. In some instances, the user will be provided with a trivia quiz, in which he is asked details about one or more family members or acquaintances.

In some embodiments, a combination of any of individual questions, questionnaires and trivia quizzes are used in order to obtain the relevant data bits from the user. In some further embodiments, a plurality of users may all participate in a trivia quiz simultaneously.

In accordance with some embodiments of the present invention, a user may receive a questionnaire by email, fax, mail or the like and he may fill in the questions and send a filled in questionnaire to a postal address, fax, email, Internet address of the system 200. In accordance with some embodiments of the present invention, a user may receive (by email, fax, mail or the like) a questionnaire regarding second-degree family members, and he may fill in the questions and send a filled in questionnaire to a postal address, fax, email, Internet address of system 200. System 200 may have search engine tools for mining other online databases, such as, but not limited to, online family trees. Additionally, experts may mine offline sources of information, such as National Registries and Church records.

Another way of obtaining information from an individual about himself is by interviewing him directly or by phone, for example.

Online sources of information may be used for obtaining information regarding individuals (for obtaining IDBs, IDSs), for developing relationship webs and for developing virtual communities. Such sources of information include, but are not limited to, personal websites, family websites, online family trees, online search engines, community websites, academic institution websites, schools and higher education alumni association websites, professional association websites, industrial company websites, dating websites, blogs and chat websites.

Offline sources of information, which may be used for obtaining information regarding individuals, for developing relationship webs and for developing virtual communities, include, but are not limited to, national registries, church, mosque and synagogue records, family trees, community records, schools and higher education records, professional association records, industrial company records and newspaper records.

Thus, users input their data bits $D_1$ and $D_2$ (steps 102 and 104). Steps 102 and 104 may take place in any order or sequence. Typically the server system 210 (FIG. 1) is adapted to store the data bits from a large number of users from a plurality of inputting devices. In some cases, the inputting is via website 205 in the Internet 205, or via the software agent installed in the user's computer. The server system 210 and/or computer 260 connectable thereto are/is adapted to activate suitable software to organize data, such as but not limited to, IDBs from the plurality of users (up to the whole world population) in an organized manner such that each bit is stored in the database in an accessible manner, typically according to the type of information. For example, all information relating to personal identifiers may be stored in a personalized identifier data bank and all relationship data may be stored in a relationship data bank.

The system then activates appropriate software which is operative to compare data bits $D_1$ and $D_2$ (step 106). In some alternative embodiments, the system retrieves some data from the verified database and compares it with some freshly inputted data. In some further alternative embodiments, the system compares two pieces or sets of data, both of which are retrieved from the verified database 211 or another memory in system 200. In some cases, IDBs of one user are compared with the corresponding IDBs of another user. This comparing step 106 may be activated to compare one, several or all of the IDBs of the two users. In some embodiments, comparing step 106 may be repeated a large number of times and the IDBs of selected two or more users may be compared.

For example the first user, denoted $User_{(1)}$, has inputted data relating to his/her age, gender, place of birth, eye colour, date of birth, father's name and mother's name. The second user, denoted, $User_{(2)}$, has inputted corresponding data relating to $User_{(1)}$. In some embodiments, comparing step 106 may be operative to provide a binary output of "match/mismatch" relating to the two pieces of data that were compared. In some other embodiments, the output may provide a score based on the closeness of match.

The server system 210 may calculate the relative reliability and or ratio of reliability of two data bits $D_1$ and $D_2$ provided by $User_{(1)}$ and $User_{(2)}$. Then, the system operates to determine whether a match between data bits $D_1$ and $D_2$ (between IDBs of the first and second users) is reliable according to a predetermined criterion (step 108). For example, a relative reliability R of more than 8 out of 10 is required for a preliminary acceptance of the data in this step.

Figure 3B:
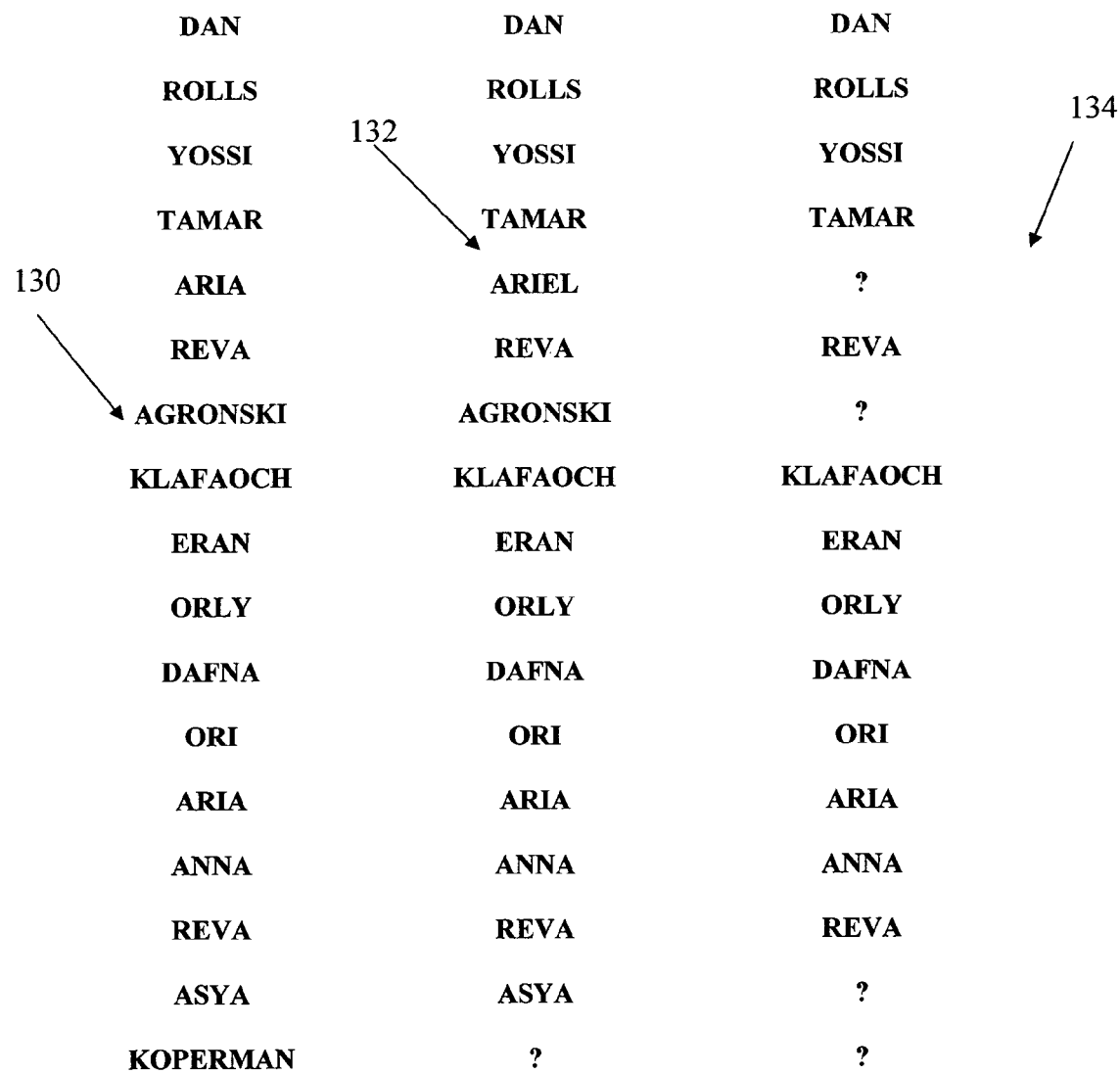
FIG. 3B is a schematic diagram illustrating the method for matching data bits pertaining to an individual according to an embodiment of the present invention.

FIG. 3B exemplifies data strings 130, 132 and 134 of users (1), (2) and (3), respectively, showing common sequences in these family trees. In a comparing step 108, these data strings are compared.

In case the match between data bits $D_1$ and $D_2$ is of required reliability, they are ascribed a reliability and will typically be stored in the system. For example, the data strings 130 and 132 having a reliability of over 95% may be ascribed a high reliability (step 110), whereas the data string 134 will be rejected and be ascribed a low reliability (step 122), as the reliability thereof relative to data string 130 is around 50-70% and relative to data string 132 is also around 50-70%. In some cases, the low reliability scores are stored in the system, in other cases they are rejected and are not stored.

As can be seen in FIG. 3B, in the data string 134 some pieces of data are missing. There are two ways of trying to obtain the missing information: system 200 operates to generate a request for more information from the same user (step 126) or, optionally, the system operates to contact another user (step 124) and then request the information (step 126).

It should be understood that many variations and permutations of the method described above may be applied, and the invention should not be construed as being limited to the specific examples.

The data comparing step (step 106) can be applied to any combination and/or permutation of corresponding data bits from different users and should not be construed as limited to $User_{(1)}$ and $User_{(2)}$.

In some embodiments, the server system may be set up to provide different weightings to the data bits. For example, the weighting of data provided by an individual regarding himself may be twice that of a sibling relating to that individual and three times more than that received from a cousin regarding that individual. The degree of closeness of the user providing the information relating to the individual may be used to calculate the weighting. The weighting may therefore be calculated as a function of the number of verifications multiplied by the weighting assigned to each of the verifications (each of which is itself a function of the closeness of the two users in that verification).

Thus, in some embodiments the data provided by $User_{(1)}$ regarding the mother's name, place of birth and age may be accepted, whereas these data provided by $User_{(2)}$ may be rejected due to the lower weighting thereof.

If the relative reliability is considered to be too low for data bits from $User_{(1)}$ and $User_{(2)}$, a low reliability weighting is ascribed to at least one of the data bits from $User_{(1)}$ and from User(2) in ascribing step 110.

In a data requesting step 126, the system sends a request for more information from $User_{(1)}$ and User(2). In some embodiments, the request may be sent to only one of the users or to a large number of users. In some cases, the request may include, but is not limited to, re-entry of some or all of the data previously entered and/or new data bits.

In some embodiments, further information or data will be requested and the users input the information in at least one iterative repeat of data inputting steps 102, 104. Additionally or alternatively, the system may request more information from $User_{(3)}$ and/or from any other user.

In some embodiments, the weighting described hereinabove will be used to accept/reject data on a binary accept/reject basis. For example, in comparing the data in data strings exemplified in FIG. 3B, only perfect matches of data of $User_{(2)}$ are accepted and stored in the system.

Having ascribed an appropriate reliability to the match between the data bits, the system checks whether $User_{(1)}$ and $User_{(2)}$ have inputted all the required data (step 112). If negative, the system requests further data or IDBs (step 120). If affirmative, the data acquisition from $User_{(1)}$ and $User_{(2)}$ is completed and the IDBs and reliability data is stored (step 114), and another checking step 116 is carried out to determine whether sufficient data from all the users exists in the system. If negative, the system goes to the next user to update the data (step 118). In some embodiments, the system requests further data from $User_{(3)}$ or any other user. In other embodiments, the system compares the pre-entered data in another iteration of steps 106-114.

In checking step 116, if all the data has been obtained from all the set of users, then the data obtaining process is complete. However, it is envisaged that, according to some embodiments, this process may be an ongoing process over a large number of years.

As indicated above, different weightings may be assigned to the data bits. In this connection, it should be understood that many different weighting models and comparison algorithms known in the art can be applied in steps 108, 112 and 116, which are all construed to be part of this invention.

As exemplified above, the data sequences from the users' family trees may be verified by using the method of FIG. 3A. The data sequence is one form of presenting the IDB data which can be used to merge and match information pertaining to different individuals and to form a connection between different individuals in the formation of a relationship web. The data sequence is part of the IDB and comprises data, typically with regard to first degree family and details thereof. For example, Dan; Rolls; Yossi; Tamar; Aria; Reva Agronski; Klafaoch; Eran; Orly; Dafna; +Ori Aria; Anna Reva; Asya Koperman. Such data sequences are not limited to names, they may include years, places, identity numbers, alphanumeric characters or any other data pertaining to that person's identity.

Figure 3C:
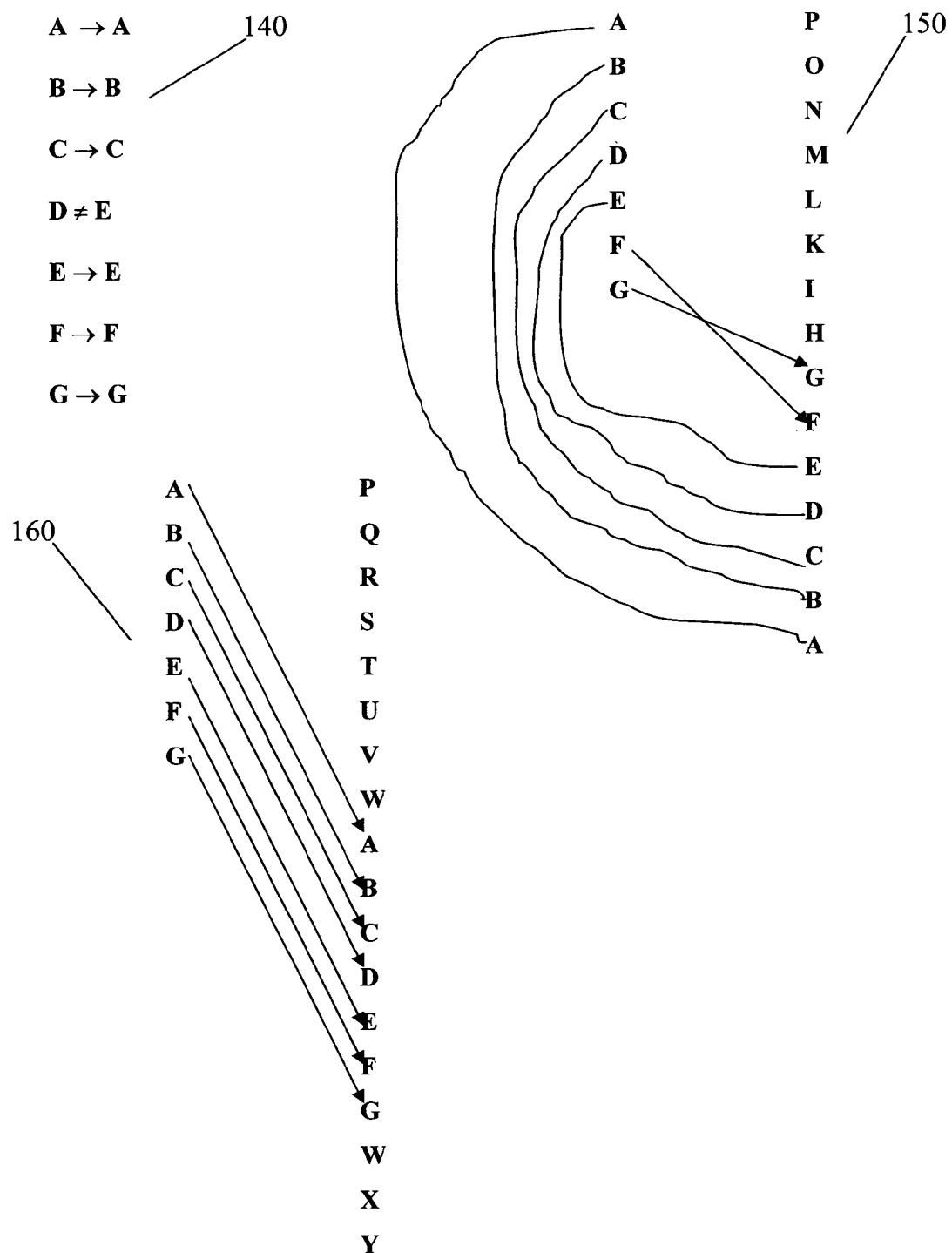
FIG. 3C is a schematic diagram showing different methods for aligning data bits pertaining to an individual according to an embodiment of the present invention.

FIG. 3C exemplifies strings of data (data sequences) provided as alphanumeric symbols and pertaining to an individual, received from two different sources. As shows, a match between such data strings can easily be identified and marked (recorded) by an alignment scheme. In such alignment scheme 140, there is only one mismatch, but the reliability is sufficient to allow the match to be accepted. In alignment scheme 150, one of the strings is inverted, in order for the match to be determined. In alignment scheme 160, the match is made in the same direction, though one of the strings of data is displaced vertically from the other. These examples should not be construed as being limiting. The system of the present invention (e.g. configured as system 200 of FIG. 1) is constructed and operative to match strings of data in many ways, similar in concept, for example based on the principles of hybridizing similar DNA sequences, as is known in the art.

In accordance with certain embodiments of the present invention, the person identifier is generated together with registration of the corresponding individual as a person characterized by a personal record stored in the system. The person identifier is generated based on information comprised in the corresponding personal record. The computer associates the person identifier with corresponding personal record and with sub-records assigned to the person in other personal records. The association may be provided by including the person identifier or derivatives thereof in the record and/or sub-records, and/or by providing the records and/or sub-records with links and/or other indications to corresponding person identifiers, etc.

The person identifier may be generated in a form of predefined set of building blocks (e.g. fields or other logical entities) organized in predefined sequence order. The person identifier, by way of non-limiting example, may include information related to the first name of a person ($1^{st}$ building block), family name of the person ($2^{nd}$ building block), name of father ($3^{rd}$ building block), name of mother ($4^{th}$ building block), mother's maiden name ($5^{th}$ building block), names of grandfathers ($6^{th}$ building block) and grandmothers ($7^{th}$ building block), etc. The information may be stored in the original form (as entered) and/or as derivatives thereof. For example, as names of persons, geographical names or other names may be differently spelled, the original data may be normalized by using a phonetic algorithm (e.g. double metaphone, SOUNDEX and/or alike) before storing in the building blocks. As a rule, phonetic algorithms are not enough to cope with the differences caused by different languages. For example, descendants of a person with name Jacob living in different countries may enter his name as Yaqub (Arabic), Hakob (Armenian), Jaakko (Finnish), Jacques (French), Jakob and Jacob (German), Iakovos (Greek), Ya'akov (Hebrew), Jacobo, Jaime and Yago (Spanish), etc. In certain embodiments of the present invention all known variations of certain personal, geographical or other names may be normalized before storing and then stored in a unified form (e.g. Jacob or some coded name for any of variety of names above) in addition or instead of storing the original form.

Those skilled in the art will readily appreciate that the teachings of the present invention related to information normalization are applicable in a similar manner to any other information stored or to be stored in the system.

Comparing the person identifiers starts with comparing the corresponding building blocks entered by two or more individuals. For example, in certain embodiments of the invention, the building blocks may be organized in certain pre-defined sequence order with empty blocks when necessary, and/or the building blocks may have pre-assigned sequential block numbers regardless the preceding blocks actually comprised in the sequence. In such and similar embodiments, the person identifiers may be compared with the help of one or more algorithms comparing building blocks with the same sequential number. If the resulting number of substantially identical building blocks fits a certain criterion (e.g. pre-defined number of non-empty substantially identical building blocks), then the person identifiers are considered to characterize the same person.

Comparing the person identifies for obtaining related personal record may include at least two steps as follows: All person identifiers stored in the database are processed for initial comparing per predefined limited set of building blocks (e.g. only comprising information about person's name and date of birth), thus giving rise to likely matching person identifiers. Then, the rest building blocks operating on likely matching person identifiers are compared.

In certain embodiments of the invention, the computer system may continue comparing the person identifiers even if the resulting number of substantially identical building blocks does not fit certain criterion. Lack of information may be one of the reasons of inconsistency; accordingly, the computer checks if one of comparing building blocks is empty while the other(s) comprises some information. If "YES", the computer may request the user and/or one or more external sources for additional information, or ask the user to confirm that information in non-empty block(s) is right; and update the empty building block accordingly. If "NO", the computer may check possibility of further correction of information comprised in the inconsistent building blocks (e.g. to ask user to correct information, check possibility of normalization or re-normalization of names, etc.) and update the building blocks accordingly. Thereafter, the computer repeats operation of comparing the corresponding building blocks. If the number of substantially identical building blocks fits certain criterion, the person identifiers are considered as characterizing the same person. The computer updates the person identifier(s) in accordance with updated building blocks.

Optionally, if number of substantially identical building blocks does not fit certain criterion, the server system may operate to modify comparing person identifiers by changing the predefined set of building block and generating new person identifiers in accordance with the new set. Such modification may be effective, for example, if information lacks in many blocks, if there are reasonable assumptions of information incorrectness, etc. The modification may be provided by request of an authorized user and/or if the building blocks in the original person identifier fit certain criterion (e.g. more than 50% of blocks are empty). The computer repeats the comparing operation of the modified person identifies as detailed above. Typically, the modified person identifiers are generated as temporary objects for certain comparing operation(s).

Those skilled in the art will readily appreciate that other embodiments of person identifiers may be implemented and different comparing algorithms may operate on any or all person identifies and may use methods known to those skilled in the art or methods that are apparent in light of this disclosure.

In certain embodiments of the present invention one or more person identifiers may be ranked in accordance with their trustworthiness. The ranking may be provided in accordance with different criteria, e.g. total number of sub-records associated with certain person identifier, number of successful comparing operations, number of updates during comparing operations, source and/or time of last update, etc. Information in some personal records may pass special certification with regards of its trustworthiness, accordingly, person identifiers associated with such records and sub-records thereof may be used as highly-ranked pattern for matching and appropriate ranking the other person identifiers. The present invention provides a method of using the database, comprising verified data relating to identity of a plurality of individuals. The verification provides for authenticating the identity of the individuals, and allows for defining one or more levels of permitted communications between individuals in this database and the user. This enables secure communication between the user (which may also be the individual whose related data is stored in the verified database), and one or more other verified individuals.

In some embodiments of the invention, this technique includes determination of a level of confidence in the authenticity based on correspondence between data on the individual entered by different users. Preferably, a graded personalized exposure mechanism is used to enable a user who is an authenticated individual to expose his identity at different levels responsive to the type of communication, which is selected from personal, commercial, general and online self-exposure. Such mechanism provides a personalized protection level responsive to the type of communication. Generally, the graded personalized exposure mechanism enables an authenticated user to expose his identity at different levels responsive to the at least one of a sender and a recipient of the communication.

Figure 4A:
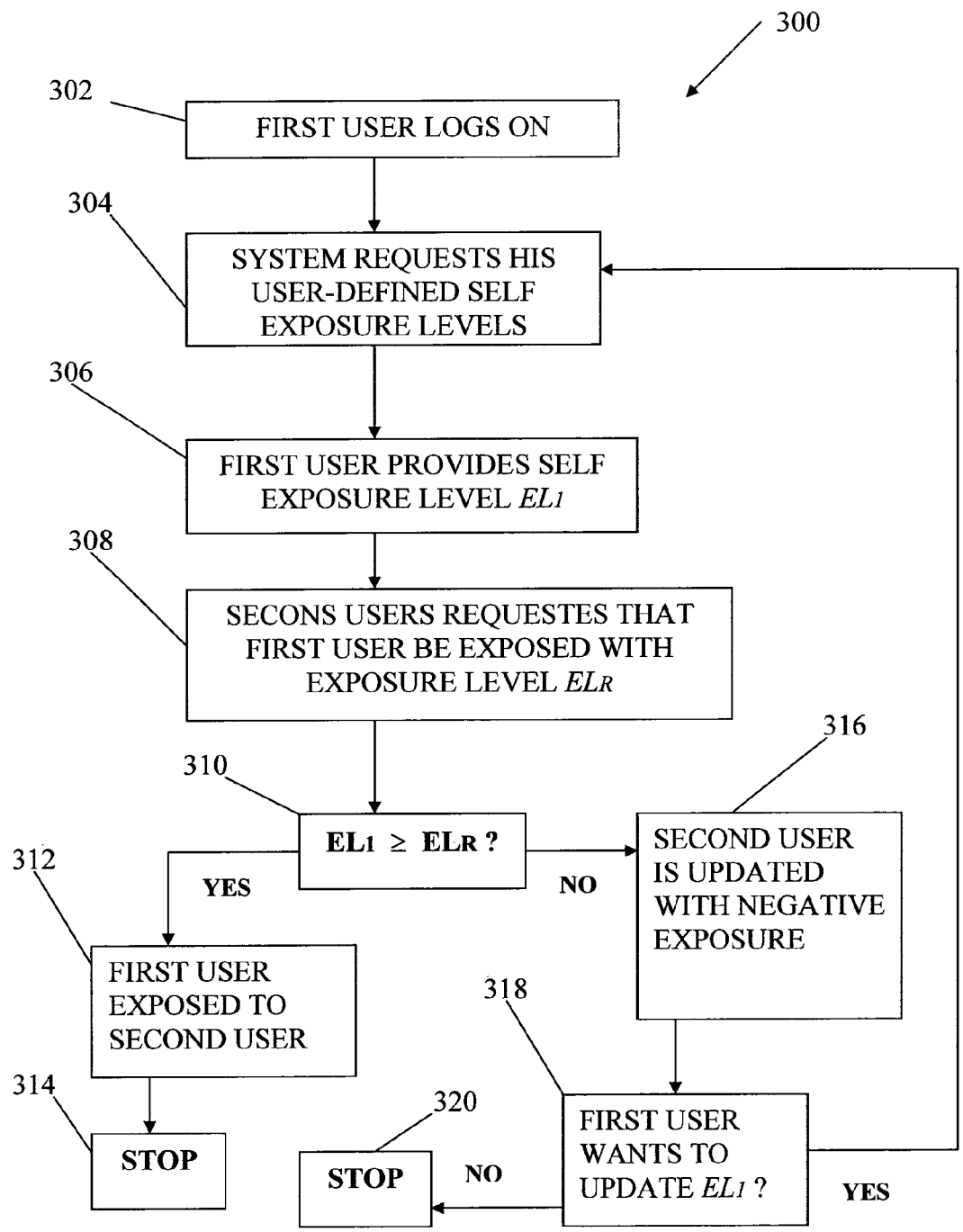
FIG. 4A is a simplified flowchart illustrating a method for user-defined determination of the level of his exposure over a public network, according to embodiments of the present invention.

Reference is now made to FIG. 4A, which exemplifies a simplified flowchart 300 illustrating a method for user-defined determination of the level of his exposure over a public network.

A first user initiates connection to the server system from his personal communication device (step 302). The server system then generates a request to that user to provide his self-exposure levels [$EL_1$] (step 304). This may be performed by a series of on-screen questions or via a questionnaire, for example.

The user provides the level to which he wants to be exposed (step 306). In this connection, reference is made to FIG. 4B showing a non-limiting example for user's selection of the level of exposure. As can be seen from these figures, the level of exposure is a function of the data/information being exposed, as well as the audience/recipient(s) of the exposed information.

The lowest exposure level, designated "1", for example, is allowing the system to provide a general profile, such as one's age, gender, location, occupation and hobbies anonymously. By "anonymously" is meant that the person's identity, domicile and contact details are all withheld from the recipient(s) and thus the user cannot be found by the recipient(s) by being provided with the profile.

At a second level of exposure "2", the user allows more personal details to be exposed anonymously.

At a third level of exposure "3", the user allows his business and financial profile to be exposed anonymously.

Exposure levels 4-6, parallel to levels 1-3, allow a person's general, personal and business profile to be exposed to authenticated family members, respectively.

Exposure levels 7-9 allow a person's general, personal and business profile to be exposed to the general public offline, respectively.

Exposure levels 10 allows a person to be fully exposed online in real time to a family member, level 11, is to a business colleague and level 12, to the general public.

These exposure levels are to illustrate this invention and should not be construed as being limiting.

Thus, the user may for example define his exposure level as 3 ($EL_1=3$), meaning that he only allows his general, personal and business details to be exposed anonymously.

Turning back to FIG. 3A, a second user requests that the first user be exposed at a certain level, $EL_R$ (as defined hereinabove)—step 308. For example the second user requests that the first user allows his general profile to be exposed to the public ($EL_R$=exposure level 7).

The server system operates to compare the exposure levels $EL_1$ with $EL_R$ (step 310). In this specific example $EL_1$ is lower than $EL_R$ and thus the second user's request is rejected and the second user is informed accordingly (step 316), namely the second user is updated by the system that his request has exceeded the first user's permitted exposure level. The system may for example ask the first user if he wishes to update/increase his exposure level (step 318). If affirmative, the system operation returns to step 304. If negative, the communication between the first user and the second user is prevented and halted (stop 320).

In a case where the exposure level $EL_1$ provided by the first user is greater or equal to the corresponding exposure level $EL_R$ as requested by the second user, the system allows the first user to be exposed to the second user at exposure level $EL_1$ (step 312). In some alternative embodiments, the first user may only be exposed to the second user at exposure level $EL_R$.

Figure 5A:
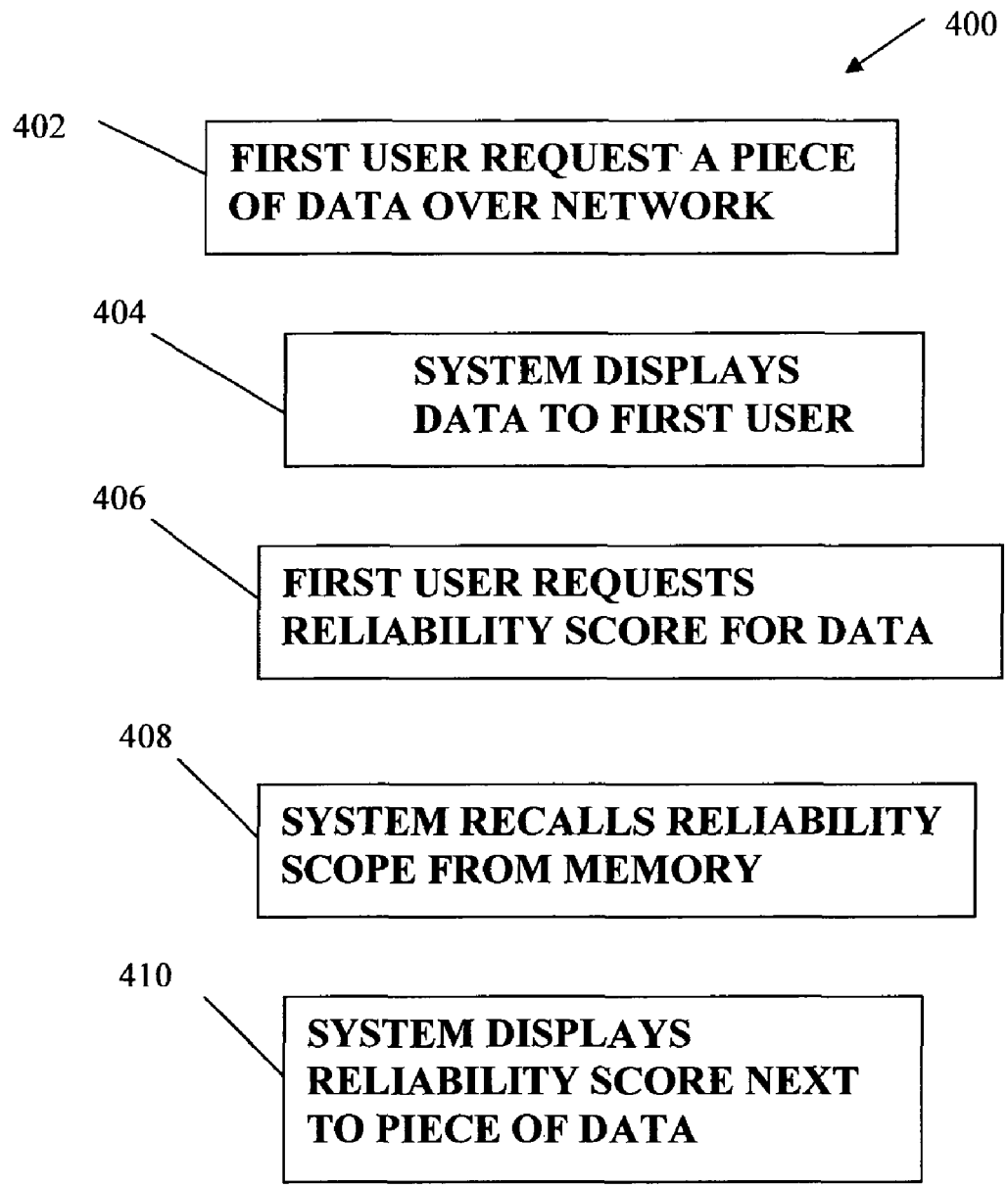
FIG. 5A is a simplified flowchart of a method for providing a scale of reliability of received data to a user over a public network, according to an embodiment of the present invention.

As described above with reference to FIG. 3A, the method of the present invention utilizes determination whether a match between data bits entered by the users is reliable. Reference is made to FIG. 5A showing a flowchart 400 of a method for providing a scale of reliability of data received by a user from the network.

A first user communicates with the server system through the network to request for some data/information (step 402).

The server system may for example operate to display the requested information on a screen of the user's personal communication device (step 404).

The user requests the system to indicate the reliability of the displayed information (step 406).

The server system operates to retrieve the reliability data (step 408). According to some embodiments, such reliability data may have been collected and stored according to the above-described method of FIG. 3A (in steps 110, 112, 122).

The system may then display the reliability data next to each piece of data information (step 410).

Figure 5B:
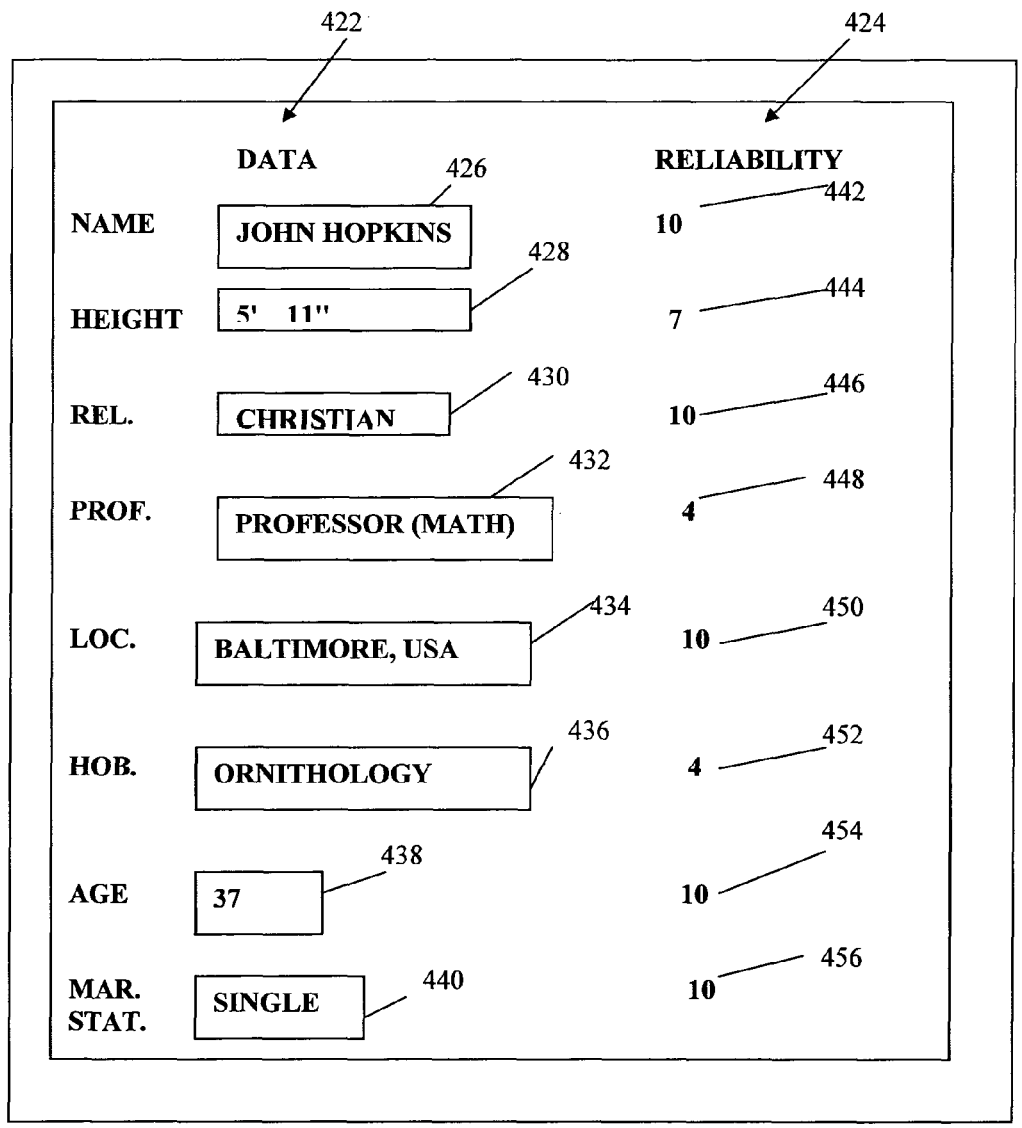
FIG. 5B is a simplified screen display of data and reliability scores for each piece of data, according to the method of FIG. 5A.

A non-limiting example of a screen display 420 is provided in FIG. 5B. It can be seen from screen 420 that data provided relates to a person and includes name field 426, John Hopkins, height field 428, 5 foot 11 inches, religion field 430, Christian, profession field 432, Math professor, location field 434, Baltimore USA, hobby field 436, ornithology, age field 438, 37 and marital status field 440, single.

It can be seen that each data field is ascribed a corresponding reliability field 442, 444, 446, 448, 450, 452, 454 and 456. The highest reliability score is 10 and the lowest is zero. In many cases, there is insufficient checking to provide a high score. For example, a user is uncertain of the height or provides the wrong height of the person and thus the reliability score thereof is relatively low. In some examples, the person gives false information, such as his profession, and no second source can be found to back up this information and thus the reliability score thereof will be low (for example, he may be a kindergarten teacher and not a university professor). In some cases, an overall reliability score is provided to the user, which may be an averaged, mean or weighted average or mean of all of the reliability scores of the individual data fields.

It should be understood that the reliability scores may not only be a function of the actual data provided by a user, but also a function of the reliability of the user himself, such as it may be related to the time the user is registered in the system (typically increasing time increasing reliability), it may be a function of the number of supporting pieces of data (typically, the more pieces of data from different users, the higher the reliability); it may be in relation to the time period of inputting the various pieces of data (typically, the longer the time period between the inputs, the lower the reliability); it may be a function of the closeness of the users (typically, the closer the users are, the more reliable the data).

The screen may for exampled be facilitated by the appropriately configured user interface. For example, such user interface may be configured to provide the user with template, navigation and control buttons, and the user's family tree. The family tree may be automatically generated by the system upon obtaining predefined information (e.g. answers on first two questions) and automatically updated upon receiving further information. The family tree may be generated in accordance with the corresponding tabulated database record comprising data fields relating to the relatedness of the individuals in the family tree.

The family tree may be organized into an organizational chart, in which the user (Simon son of Jacob, or Simon Jacobs) is in a central circle, around which concentric annuli are disposed relating to family members starting from the first degree family members. More specifically, the first degree family members (parents, full brothers) indicated in the first inner annulus. The people of first-second degree relatedness (half-brothers, half-mother/aunt and father's concubines) appearing in the second annulus from the center. The third annulus from the center includes names of the people of a second degree of relatedness to Simon, such as his grandparents. Similarly, in a fourth annulus, people of a third degree of relatedness to Simon appear, such as his great-grandparents, appear.

In this way, the user, Simon, can immediately see the degree of relatedness of his various relatives.

Each relative may be ranked on a vertical scale according to a particular parameter, but remains within the specific annulus to which he/she belongs. For example, all family members older than Simon appear vertically above him and all people younger than him appear below him. It should be understood that the ranking may be in the opposite direction, according to some embodiments. In some cases, the organization may be horizontal as opposed to vertical. According to some further embodiments, two different parameters may be ranked, one horizontally and the other vertically.

According to some other embodiments, there may be two organizational charts comprising the same family members, one for the individual to decide on the family members from whom he wants to receive information, and the other to whom he wants to provide information.

According to some other embodiments, each button on the organizational chart may have two sub-areas, one the individual choosing to receive information from that family member, and the other for choosing to provide information to that family member from the individual. Many other variations on the chart are envisaged which are part of the present invention.

The user may choose the parameter for vertical ranking. Some parameters which could be chosen include: marital status, geographic distance from the user, income, health parameters and the like.

It should be further noted, that the user can decide on the family members, with whom he wishes to communicate and those with whom he wants no contact. Each family member appears as an on-screen button, which can be activated/inactivated by pressing it on or off respectively.

For example, Simon may not like his half-brothers or his deceased half-mother. He may detest his father's concubines. He can thus press the buttons of all the aforementioned and disable any communication with them/about them. The system can be configures such that when all these buttons are pressed, the corresponding names appear differently on the screen to all the other people's buttons.

As indicated above the user interface may provide navigation and control buttons to assist the user in activating and using the organizational chart.

As indicated above, the information regarding individuals can be obtained from various online sources of information including inter alia family websites and personal webpages. The family website may include multiple webpages each corresponding to a different member of the same family. The webpage presents the individual's personal details, including the individual's name, his photo, personal identifiers organized by standardized identifier titles, and possibly also some other personal details which may be extracted from the family tree database and formatted into guided templates having appropriate headers. The webpages of the individual's family members, such as his mother and father, are configured with a similar format. The webpages of different family members can be displayed simultaneously or at different times, and the display size may be changed by activating standard toolbar buttons known in the art. It should be understood that data/information fed into an individual web page in a family portal/website can be fed back into a family tree display and/or into a family tree database.

The system can be configured for displaying individual-relating information in a chronological unexpanded personified time line. Data is extracted from at least one of a family tree database, a family tree display, and family or individual web pages, and then fed into a chronological time line, which can be appropriately displayed. The time line may comprises an array of divisions, each signifying a certain period of time. For example, the divisions may be decades and the time line may run from 1900 to 2010, with at least some of the time periods being displayed on the time line. Personalized events are displayed chronologically and are provided with titles in the language of the individual. The user interface may be configured to enable expanding and contracting the scale of the timeline. Additionally, the user interface may be configured to enable moving the timeline leftwards into the past, centralizing into the present or moving rightwards into the future. Expanding of such personified time line enables to see at least a part thereof with the divisions being in months. On this timescale, birthdays and other personalized events can be displayed. This data can be extracted from the family tree database, from an online/offline family tree, from national or church records or any other data source known in the art.

The information and data of an online family tree is positional information. Thus, this information can be used to prepare "family map". For example, all the family members of the Smith family may be located in hundreds of different states and countries around the world. However, the family of Jane Jacqueline Smith (date of birth Jan. 1, 1965) of Sheffield, UK may all be located in Yorkshire and in Lancaster in England. A family map may be constructed using the family tree information of Jane Jacqueline Smith showing which of her family members live in Yorkshire and which in Lancaster. A family member may be able to move a cursor on an online map and to see which family members are located at which location. For example, if the cursor touches on Sheffield, three family member's names may appear (Jane Jacqueline Smith, her father John and her mother Angela). Upon moving the cursor to Hull, the names of her brother Peter and his family members will show on screen. Upon touching on Lancaster, her aunt and cousins names will become apparent.

Family maps may be constructed to be 'zoomed in" and zoomed out" in a similar way to Google Earth (www.earth-google.com). Thus, the scale of the map of a continent or state be too small to accurately see all the family members, but by zooming in one will be able to clearly see all the family members located in one street or one neighborhood. In some cases, where there are not a large number of family members, one may be able to see all the family members on a state or continent map.

A family member may wish to know all the family members who live within a mile of his house. He will therefore focus the center of the map at his address and zoom in/zoom out until the scale of the map is around 1:10000 (20 cm screen showing 2 km) and then he can see the specific location of each family member in the vicinity of his house.

A family member who is planning a vacation abroad can choose a location for his vacation on the basis of finding relatives at that location employing his family map.

A plurality of family members can make a family reunion, rendez-vous, family outing, family vacation or holiday on the basis of knowing the geographic location of other family members, and also knowing how those family members are related to them.

In some cases, one may be able to move the cursor by "drag and click" methodology, for example, from oneself to another family member on the family map to show geographic distance between two or more family members. Additionally or alternatively, the online family map and/or online family tree may have a mechanism for showing a relatedness measure between the family members. For example, the distance between user A grandfather and user A himself may be provided as "2", being indicative of two generations or may provide the word "grandparent/grandchild" on screen.

A family member may surf on the family tree website and may thus learn about the relatedness of various family members to himself and to other family members.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

The disclosures of all publications mentioned herein are incorporated herein by reference.

Although the invention has been described in conjunction with specific embodiments thereof, it is evident that many alternatives, modifications and variations will be apparent to those skilled in the art.

The invention claimed is:

1. A method for communication between users over a communication network, comprising:
   (a) providing a database which comprises verified data relating to identity of an individual, said database being accessible through the network and the verified data being used for authenticating the identity of the individual, the database being constructed by;
      permitting a plurality of individuals related to the said individual to each enter data on the individual wherein the data is an individual-associated data bits (IDB) comprising a personal identifier and relationship data indicative of a family tree,
      generating an individual-associated data set (IDS) from the IDB wherein the IDS comprises data on the individual and related individuals,
      verifying the IDS for the individual by determining the level of reliability based on a degree of similarity between data on the individual entered by different individuals, and
   (b) compiling the individual data sets (IDSs) to construct the database, and defining one or more levels of permitted communication between individuals in the database and the verified individual on the basis of the verification.

2. The method according to claim 1, wherein the defining step comprises, providing at least one of the authenticated users with a graded personalized receiving mechanism.

3. The method according to claim 2, wherein the graded personalized receiving mechanism is configured to enable an authenticated user to receive communications at different levels responsive to the type of communication.

4. The method according to claim 2, wherein the graded personalized receiving mechanism enables an authenticated user to expose his identity at different levels responsive to senders or recipients of the communication.

5. The method according to claim 1, wherein the authenticating of the identity of the individuals comprises providing a user with a score for the reliability of the data.

6. The method according to claim 5, wherein the data is received from said user.

7. The method according to claim 5, wherein the data is received from another, authenticated network user.

8. A computerized system connectable to a communication network, which is configured and operable for carrying out a method according to claim 1.

9. A system for enabling communication between users over a communication network, the system comprising;
   a server system associated with a database comprising verified data relating an individual, said server system being configured and operable to verify at least some of the data so as to authenticate an identity of the individual;
   determining a level of reliability in authenticity based on correspondence between data on said individual entered by a plurality of related individuals; and
   the system being configured to define one or more levels of permitted communication between individuals in the database and the verified individual on the basis of said verification.

10. The system according to claim 9, wherein the server system is configured for creating said database.

11. The method according to claim 1, further comprising:
   providing an organizational chart of data relating to a plurality of individuals;
      verifying at least some of the data so as to authenticate an identity of at least one of the individuals by determining a level of reliability in authenticity of the individual based on correspondence between data on said individual entered by different users; and
      allowing at least one individual to define one or more levels of permitted communication between the individual and a network user on the basis of said verification.

12. The method according to claim 11, wherein the organizational chart comprises a plurality of areas, each area defining a degree of relatedness of one or more individuals to the user.

13. The method according to claim 11, wherein the organizational chart comprises a control button for each individual.

14. The method according to claim 13, wherein the user can prevent receiving a communication from an individual by activating the control button for that individual.

15. The method according to claim 13, wherein the user can prevent providing a communication to individual by activating the control button for that individual.

16. The method according to claim 11, wherein the organizational chart displays the individuals in a location responsive to a parameter pertaining to each individual.

17. The method according to claim 16, wherein the parameter is selected from age, marital status, geographic distance from the user, income, and a health parameter.

* * * * *